Figure 1:
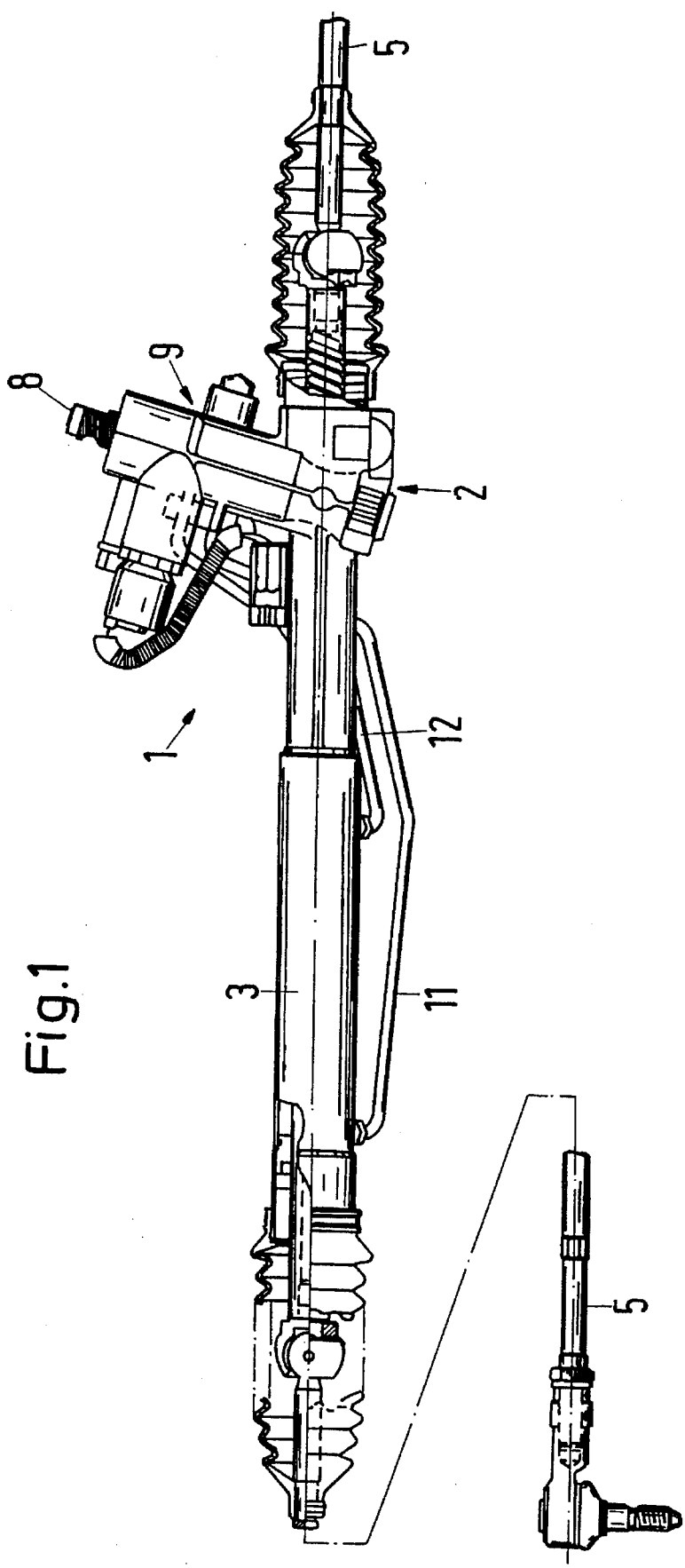

United States Patent [19]
Eberhart

[11] Patent Number: 5,582,091
[45] Date of Patent: *Dec. 10, 1996

[54] STEERING BOOSTER

[75] Inventor: Eugen Eberhart, Düsseldorf, Germany

[73] Assignee: TRW Fahrwerkesysteme GmbH & Co. KG, Dusseldorf, Germany

[*] Notice: The term of this patent shall not extend beyond the expiration date of Pat. No. 5,339,917.

[21] Appl. No.: 250,050

[22] Filed: May 27, 1994

[30] Foreign Application Priority Data

May 28, 1993 [DE] Germany ............... 43 17 818.9

[51] Int. Cl.⁶ ................................................ F15B 9/10
[52] U.S. Cl. ................................................. 91/375 R
[58] Field of Search ......................... 91/375 A, 375 R

[56] References Cited

U.S. PATENT DOCUMENTS

| | | | |
|---|---|---|---|
| 4,632,204 | 12/1986 | Honaga et al. | 91/375 A |
| 4,796,715 | 1/1989 | Futaba et al. | 91/375 A |
| 4,819,545 | 4/1989 | Dymond . | |
| 4,877,100 | 10/1989 | Emori et al. | 91/375 A |
| 5,339,917 | 8/1994 | Eberhart | 91/375 A |

FOREIGN PATENT DOCUMENTS

| | | | |
|---|---|---|---|
| 369311 | 5/1990 | European Pat. Off. | 91/375 A |
| 4026163A1 | 3/1991 | Germany . | |
| 4119913A1 | 1/1992 | Germany . | |
| 4201311 | 2/1993 | Germany . | |

*Primary Examiner*—F. Daniel Lopez
*Attorney, Agent, or Firm*—Tarolli, Sundheim, Covell, Tummino & Szabo

[57] ABSTRACT

The invention pertains to a steering booster for delivering compressed oil to the left and right chambers (6,7) of a servo cylinder (3) via a rotary slide valve (9) with a pump (10), whereby a reaction piston (18) is arranged between an input shaft (14) and a control sleeve (15) of the rotary slide valve (9). In order to create a simply constructed hydraulic reaction device for this steering booster, the invention suggests that an electrohydraulic transformer (30) for controlling a hydraulic reaction moment in dependence on certain parameters be arranged in a line (31) between the pump (10) and the rear side of the reaction piston (18).

3 Claims, 5 Drawing Sheets

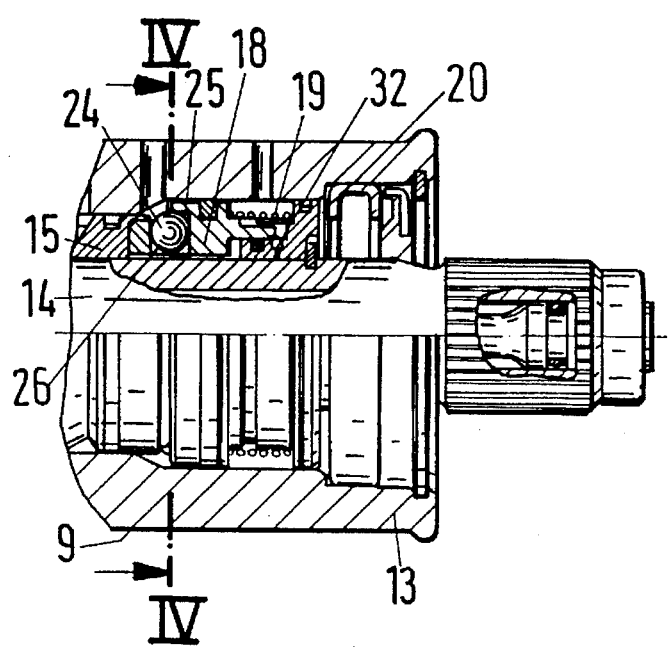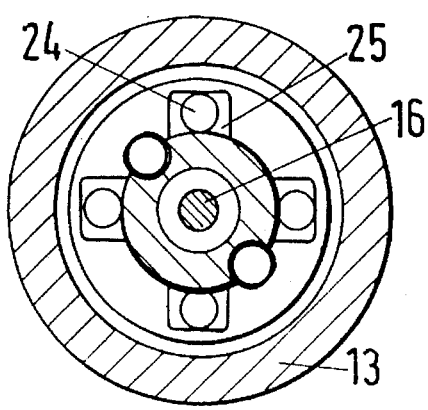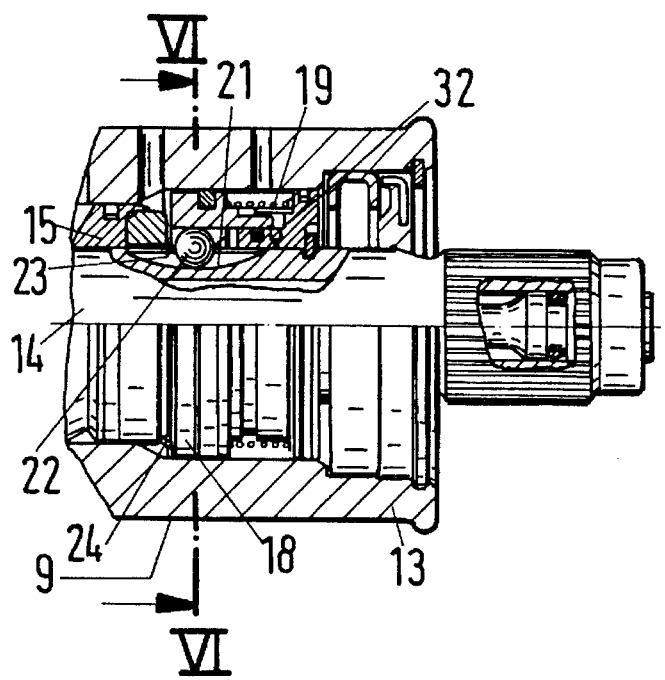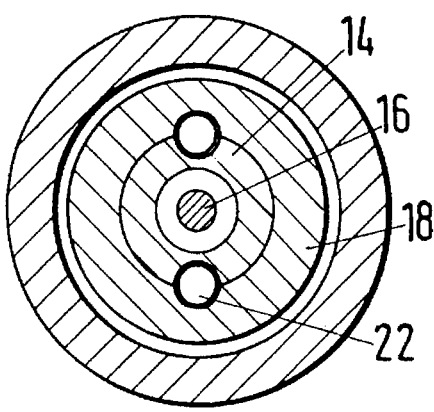

STEERING BOOSTER

The invention pertains to a steering booster for delivering compressed oil to the left and the right chambers of a servo cylinder via a rotary slide valve with a pump, whereby a reaction piston is inserted between an input shaft and a control sleeve of the rotary slide valve, and whereby said reaction piston is arranged in an axially movable fashion on the input shaft such that they rotate together and connected with the control sleeve via an elastic rotary slaving.

A steering booster of the type described previously is known from U.S. Pat. No. 4,819,545. This steering booster has proven itself in practical applications, but has the disadvantage that the road feel is not only eliminated at very slow speeds, e.g., during parking, except for a constant mechanical load which is adjusted by means of a torsion bar, but practically eliminated at increased speeds in comparison to a manual steering mechanism.

Different types of hydraulic steering boosters in which the steering forces are controlled and/or regulated in dependence on the speed have been disclosed in German Patent Nos. 4,026,163 A1 and 4,119,913 A1.

According to one mechanism of this type which is disclosed in German Patent No. 4,201,311, the reaction piston is stressed by a pressure spring. In order to create a simply constructed hydraulic reaction device, a pressure ratio control valve for reducing the system pressure to a lower reaction pressure as well as screens for controlling a hydraulic reaction moment and a return pressure in dependence on the speed are arranged in a line between the pump and the rear side of the reaction piston which is stressed by the pressure spring. This known steering booster comprises a number of components which have to be adapted to each other in order to control the reaction moment. This indicates that this device requires considerable expenditure with respect to assembly, adjustment, and maintenance. One additional disadvantage can be seen in the fact that this device lacks the desired control accuracy.

Originating from a device of this type, the invention is based on the objective to improve a simply constructed hydraulic reaction device for a steering booster in such a way that it may be utilized more economically due to the simplified construction with respect to the components used, whereby the control of said hydraulic reaction device is improved such that the steering force may be controlled more accurately in dependence on certain parameters such as the vehicle speed and thus facilitates an improved road feel, in particular at increased speeds.

The technical solution suggested for attaining this objective is characterized by the fact that an electrohydraulic transformer (EHT) for controlling a hydraulic reaction moment is arranged in a line between the pump and the rear side of the reaction piston.

The electrohydraulic transformer may, for example, be constructed as a proportional magnet which cooperates with a metering pin.

According to an additional embodiment of the invention, it is suggested to arrange a cutoff valve for limiting the maximum reaction pressure between the line leading from the EHT to the rear side of the reaction piston and the line leading to the reservoir.

It is also suggested to connect the reaction space and the return line with a relief well in the sealing piston.

It is practical to seal the reaction space by arranging a sealing piston between the input shaft and the steering housing.

A steering booster constructed according to the invention facilitates the accurate control of steering force in dependence on different parameters such as the vehicle speed under all operating conditions by means of a hydraulic reaction device. One advantage of this steering booster with a hydraulic reaction device can be seen in the fact that it facilitates "parking with only one finger" if the electrohydraulic transformer is closed and the steering moment is determined exclusively by the torsion bar. The reaction pressure may be constantly maintained at the level of the return pressure by means of a correspondingly dimensioned relief well in the sealing piston when driving straight and not performing any steering maneuvers. However, once a steering maneuver is initiated, the increased system pressure causes a corresponding reaction pressure in dependence on whether the EHT is opened, thus causing a reaction moment to act upon the input shaft that counteracts the input moment and the system pressure generated by the same.

The device according to the invention no longer requires a pressure spring in order to stress the reaction piston. However, it is possible to utilize an auxiliary spring instead of the aforementioned pressure spring. In this, the torsional stiffness of the torsion bar and the auxiliary spring may be divided in such a way that an adjustable positive centering of the steering valve may be attained by means of the auxiliary spring. For this reason, the torsional stiffness of the torsion bar is reduced by the portion compensated by the auxiliary spring. Alternatively, the auxiliary spring may also be designed in such a way that it alone defines the torsional stiffness of the constant mechanic load. The torsion bar may be omitted entirely in the latter instance.

Figure 2:
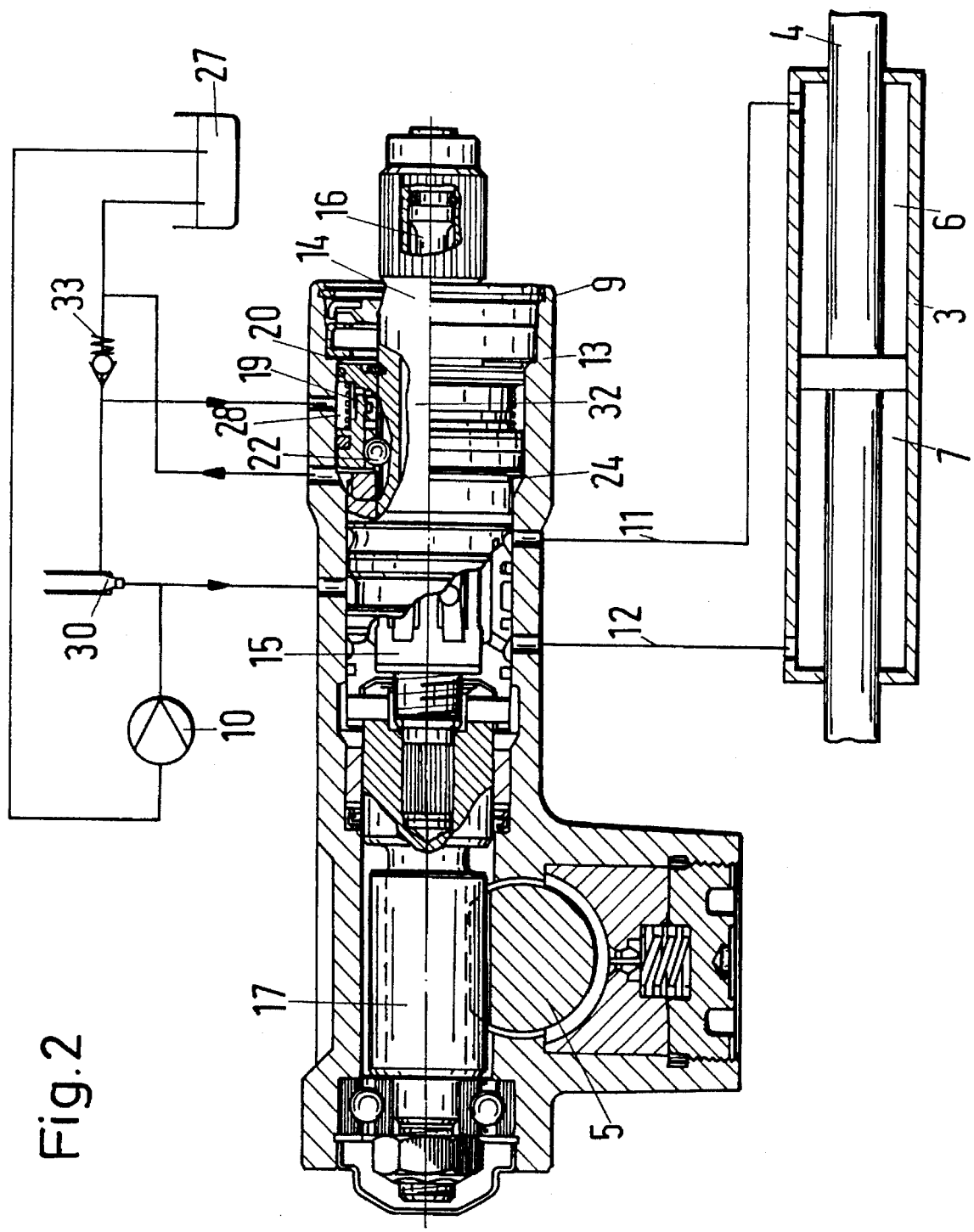
Figure 7:
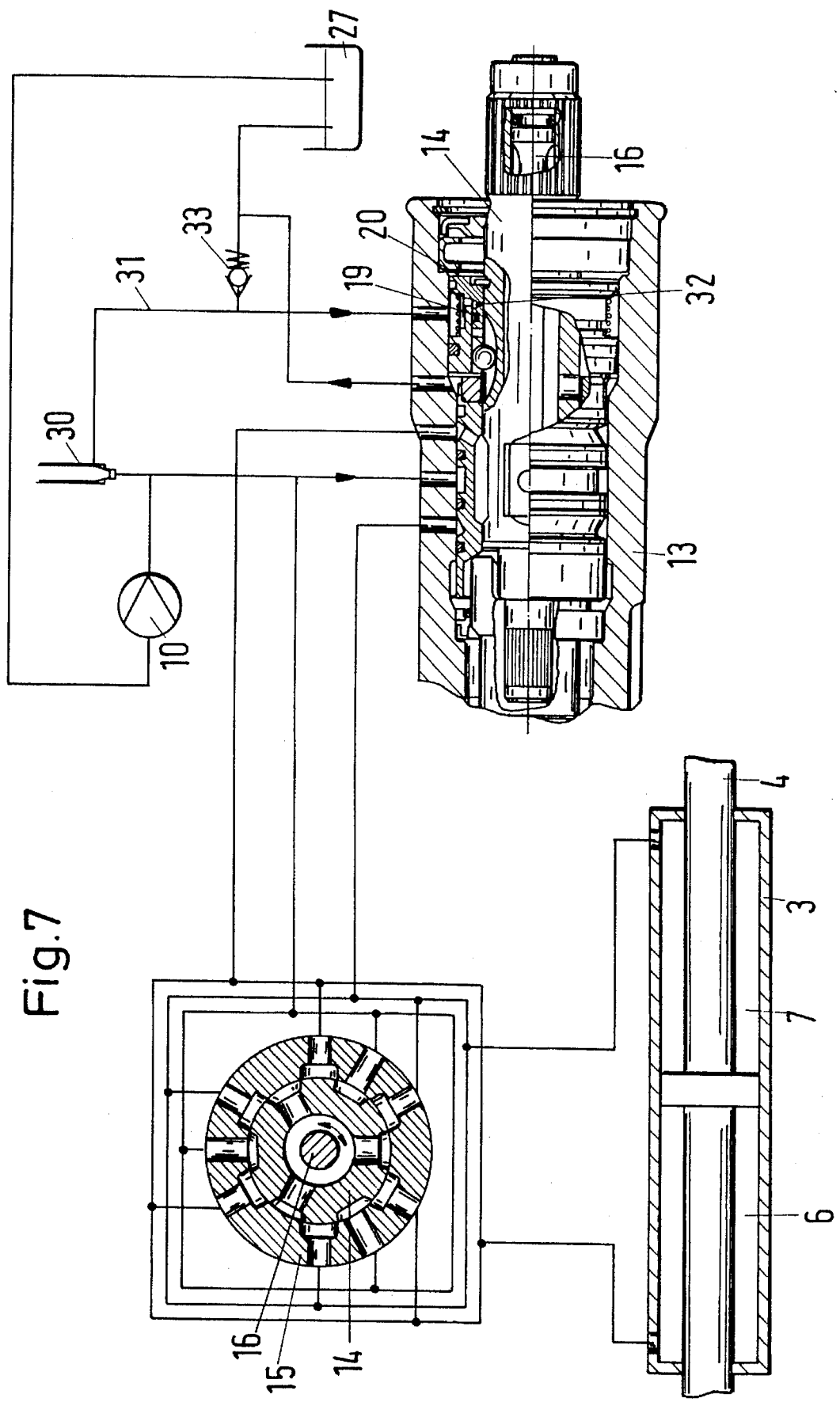

Additional details and advantages of the invention are disclosed in the following description of the figures which show a schematic representation of a steering booster which is constructed according to the invention and the corresponding hydraulic circuit diagram. The figures show:

FIG. 1: an aspect of a steering booster;

FIG. 2: a longitudinal section through a steering housing of the steering booster;

FIG. 3: a longitudinal section through a portion of the steering housing with an elastic rotary catch arranged between the control sleeve and the reaction piston;

FIG. 4: the same portion of the steering housing, but sectioned along the line IV—IV in FIG. 3;

FIG. 5: a longitudinal section through a portion of the steering housing, whereby the reaction piston is fixed in an axially movable fashion on a control sleeve such that it rotates with the same;

FIG. 6: the same portion of the steering housing, but sectioned along the line VI—VI in FIG. 5;

FIG. 7: a hydraulic circuit diagram for the steering booster, and

Figure 8:
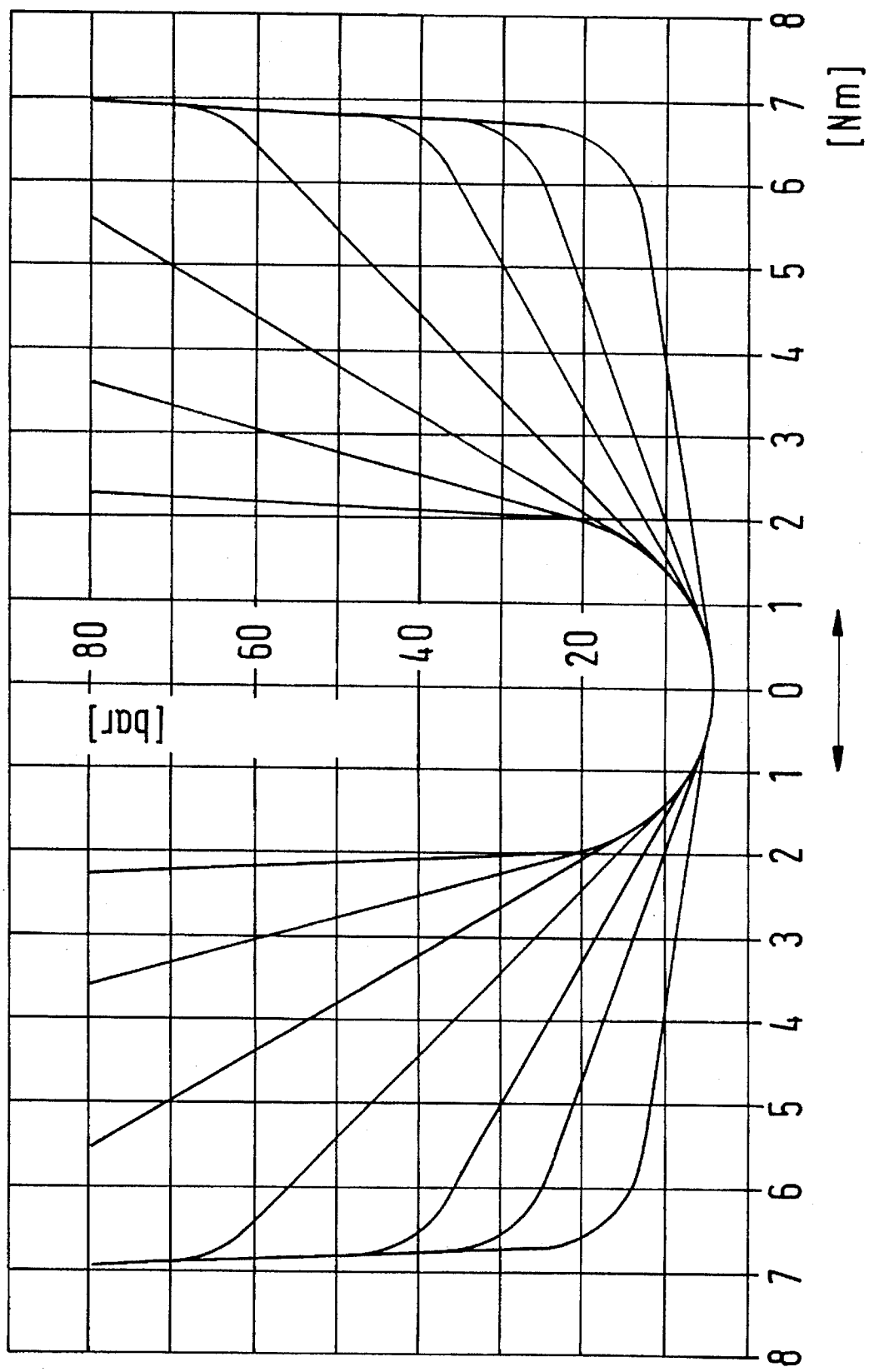

FIG. 8: a diagram showing the steady state characteristics of the steering booster.

A steering booster 1 is used in association with a mechanical steering mechanism 2 in order to reduce the steering moment to be applied onto the steering wheel. This is carried out by means of a servo cylinder 3, the piston rod 4 of which is connected with a steering tie rod 5. The two chambers 6 and 7 of the servo cylinder 3 are charged with compressed oil which originates from a pump 10 and flows through the lines 11,12 in depending on the steering deflection via a rotary slide valve 9 that is arranged on a steering column 8.

The rotary slide valve 9, which is constructed in conventional fashion-consists of a steering housing 13 which is fastened rigidly onto the chassis and comprises an input shaft 14 arranged therein as well as a control sleeve 15 situated on the steering housing. When applying a torque by means of the steering column 8, the input shaft 14 may be turned in both directions by an angle of approximately 3° to 4°. This rotational movement counteracts the torsional movement of a torsion bar 16 which is connected with the input shaft 14 as well as a driving pinion 17 which moves the steering tie rod 5 via a toothed rack.

In order to attain the desired variation of the steering moment in dependence on the speed, namely a lower steering moment while parking and a higher steering moment when the speed is increased, the desired steering moment for turning the input shaft 14 relative to the control sleeve 15 is made adjustable by means of a device described in the following. Between the input shaft 14 and the control sleeve 15 is arranged an axially movable and elastic rotary slaving by means of which the torsion bar 16 which otherwise would define the steering moment exclusively may be bypassed.

A reaction piston 18 is arranged in an axially movable fashion within an annular space between the steering housing 13 and the input shaft 14. The axially movable connection between the reaction piston 18 and the input shaft 14 consists of longitudinal grooves 21, which are arranged in the input shaft 14 and balls 22 and which are situated in the aforementioned longitudinal grooves which engage into open longitudinal grooves 23 in the reaction piston 18.

The elastic rotary catch between the reaction piston 18 and the control sleeve 15 consists of balls 24 which are arranged between the face sides of the aforementioned elements and braced on both sides within V-shaped recesses 25,26.

Once the valve is actuated as the speed increases, the reaction pressure presses the reaction piston 18 against the control sleeve 15 via the balls 24 and thus applies a reaction moment onto the input shaft 14.

During parking, the steering moment is defined exclusively by the torsion bar 16.

In order to provide better information about the road feel, an electrohydraulic transformer 30 that may be controlled variably in dependence on certain parameters, e.g., the vehicle speed, the steering deflection, or the yaw acceleration, is arranged between the supply line leading from the pump to the valve and a reaction space 28. The maximum reaction pressure is limited by means of the cutoff valve ASV which connects the line 31 with the reservoir 27.

The return of the compressed oil from the servo cylinder 3 and the rotary slide valve is carried out via the line PR leading to the reservoir 27. A relief well 32 in the sealing piston for the reaction space 28 is also connected with the reservoir 27 by an interior space in the input shaft. During parking, the reaction pressure may be reduced to the level of the return pressure by closing the EHT, thus facilitating the control of the steering wheel "with only one finger." When driving straight without performing any steering maneuvers, the reaction pressure in the reaction space 28 is also maintained at the level of the return pressure by means of the relief well 32. However, once a steering maneuver is initiated, the increased system pressure applies a reaction pressure onto the reaction piston 18 via the EHT 30, thus causing a reaction moment which counteracts the input moment. According to the steady state characteristic diagram illustrated in FIG. 8, this hydraulic reaction may be utilized for reducing the effect of the steering booster and improving the feel between the steering wheel and the road.

The cutoff valve ASV limits the maximum return pressure in the reaction space 28 and thus also a continued increase of the reaction moment. This measure limits the maximum steering moment to be applied and insures that a sufficient steering booster effect is always available at higher speeds, e.g., when having to yield to an obstacle in the road, in case of tire defects, etc.

| List of reference symbols | |
|---|---|
| 1 | Steering booster |
| 2 | Steering mechanism |
| 3 | Servo cylinder |
| 4 | Piston rod |
| 5 | Steering tie rod |
| 6 | Chamber |
| 7 | Chamber |
| 8 | Steering column |
| 9 | Rotary slide valve |
| 10 | Pump |
| 11 | Line |
| 12 | Line |
| 13 | Steering housing |
| 14 | Input shaft |
| 15 | Control sleeve |
| 16 | Torsion bar |
| 17 | Driving pinion |
| 18 | Reaction piston |
| 19 | Auxiliary springs |
| 20 | Sealing piston |
| 21 | Longitudinal grooves |
| 22 | Ball |
| 23 | Longitudinal groove |
| 24 | Ball |
| 25 | Recesses |
| 26 | Recesses |
| 27 | Reservoir |
| 28 | Reaction space |
| 30 | Electrohydraulic transformer |
| 31 | Line |
| 32 | Relief well |
| 33 | Cutoff valve |
| 35 | Line |
| PR | Return pressure |
| PRST | Control pressure in the return line |
| PSYST | System pressure |
| PHR | Reaction pressure |

Having described the invention, the following is claimed:

1. Steering booster for delivering compressed oil to a left and a right chamber (6, 7) of a servo cylinder (3) via a rotary slide valve (9) with a pump (10), whereby a reaction piston (18) is arranged in an axially movable fashion on an input shaft (14) such that the reaction piston (18) rotates with the input shaft (14) and is connected with a control sleeve (15) via an elastic rotary catch arranged between the input shaft (14) and the control sleeve (15) of the rotary slide valve (9), characterized by the fact that an electrohydraulic transformer EHT (30) for controlling the reaction moment is arranged in a line (31) between the pump (10) and a rear side of the reaction piston (18), and by the fact that a cutoff valve ASV (33) for limiting a maximum reaction pressure is arranged between the line (31) leading to the rear side of the reaction piston (18) and a line leading to a reservoir (27).

2. Steering booster according to claim 1, characterized by the fact that a relief well (32) is arranged between a reaction space (28) and an interior space of the input shaft (14).

3. Steering booster according to claim 1, characterized by the fact that an oil leakage bore is arranged on a rear side of a sealing piston (20) in the input shaft (14).

\* \* \* \* \*